Sept. 23, 1924.

V. KAPLAN

RUNNER WHEEL FOR TURBINES, ETC

Filed Sept. 1, 1921

WITNESSES:

INVENTOR

Victor Kaplan

Patented Sept. 23, 1924.

1,509,653

UNITED STATES PATENT OFFICE.

VICTOR KAPLAN, OF BRUNN, CZECHOSLOVAKIA.

RUNNER WHEEL FOR TURBINES, ETC.

Application filed September 1, 1921. Serial No. 497,746.

*To all whom it may concern:*

Be it known that I, VICTOR KAPLAN, a citizen of the State of Czechoslovakia, residing at the Deutsche Technische Hochschule, at Brunn, Czechoslovakia, have invented certain new and useful Improvements in Runner Wheels for Turbines, Etc. (for which I have applied for Letters Patent in France, Jan. 25, 1921; Italy, Jan. 14, 1921; Sweden, Dec. 23, 1920; Norway, Great Britain, Jan. 10, 1921; Austria, Jan. 2, 1918; Germany, Dec. 13, 1919; Czechoslovakia, June 4, 1920), of which the following is a specification.

The runners heretofore used for water-turbines, centrifugal-pumps, and the like, have large inlet angles, and also comparatively large outlet angles. Therefore, in order to properly deflect the water flowing through the runners, either many short blades, or few long blades are required. In both cases the surfaces wetted by the liquid are large, which means a large resistance resulting in a lowering of the efficiency.

According to my invention, I avoid this drawback by making the outlet angles, or, as the case may be, the inlet angles, at least for the greater part of the blade surface, smaller than one-eighth of the inlet and outlet angles respectively, measured on the appertaining stream lines, and by making the area of all the blades smaller than one and one-half times the area of that surface of revolution, generated by the rotation of the runner inlet or outlet edge about the runner axis.

I am aware, that there are runners, which have as compared with the blade length, a large blade pitch, but only for the purpose of avoiding the usual channel-shape between the blades, a purpose which is neither desired nor attained by my invention.

Figure 1:
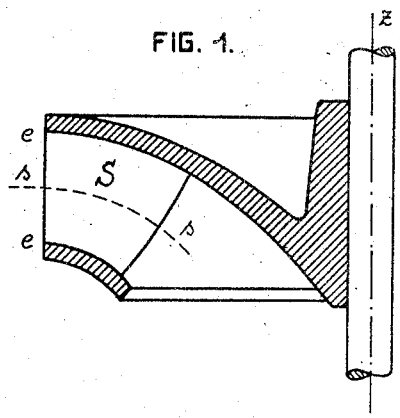
Figure 2:
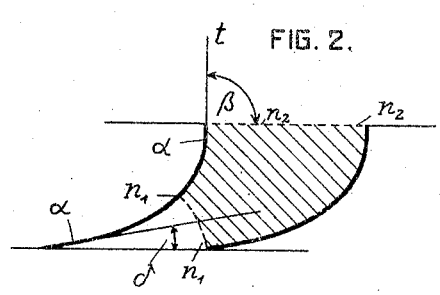
Figure 3:
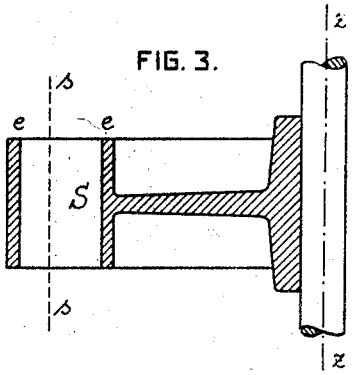
Figure 4:
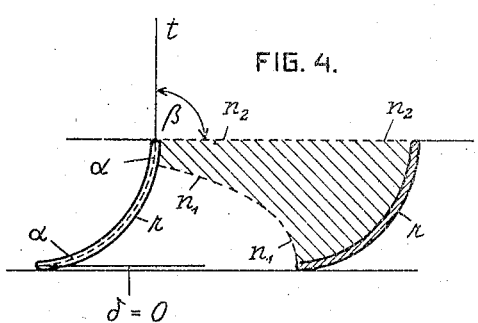
Figure 5:
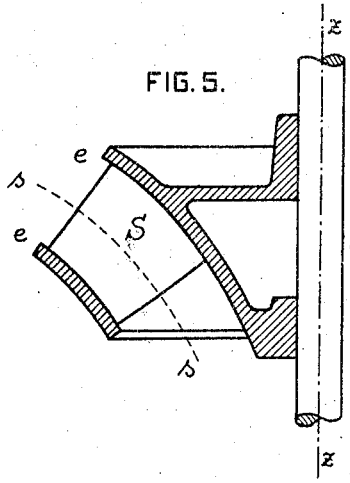
Figure 6:
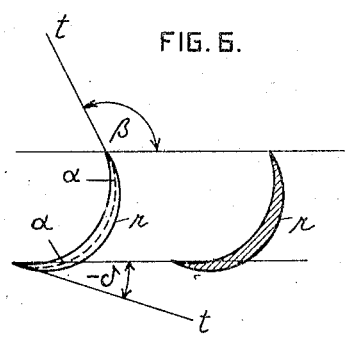

In the annexed drawing, in which a runner embodying my invention is illustrated for water turbines, Fig. 1 is a section through the left-hand half of a runner for radial admission; Fig. 2 is a diagram of two adjacent blade surfaces having the stream surface $s-s$ in Fig. 1, Fig. 3 is a section through the left-hand half of a runner for axial admission, and Fig. 4 a diagram of two adjacent blade surfaces having the stream surface $s-s$ in Fig. 3. Fig. 5 is a section of a runner for admission inclined relative to the runner axis, while Fig. 6 is a diagram of two adjacent blade surfaces having the stream line $s-s$ in Fig. 5.

The runner according to Fig. 1 is similar to that of a slow-speed Francis turbine. The shape and relative position of the blade surfaces however differ considerably, as indicated by the diagram, Fig. 2. Compared with the inlet angle $\beta$, which is made large for hydraulic reasons, the outlet angle $\delta$ is made very small, being as small as about one-eighth of the inlet angle $\beta$. Due to the shape given the blade surfaces as shown, the water would be so excessively deflected, that this expedient in itself, would only be a disadvantage. But, if at the same time, the size or the number of the blade surfaces is decreased below the usual size or number, as for instance, by making the wetted blade area smaller than one and one-half times the area of that surface of revolution that can be generated by the rotation of the runner inlet edge $e-e$ Figs. 1, 3, 5, about the runner axis $z-z$, then the whole amount of water flowing through the runner only experiences that mean deflection, which corresponds to the required hydraulic conditions. This same mean deflection therefore is achieved with either shorter or fewer blades, and necessarily with less friction, than with the heretofore customary arrangement of blades. By means of such a construction, not only is thus the efficiency increased, but if required, the specific number of revolutions can be reduced below the limits heretofore reached.

The condition above referred to, to wit, that the outlet angle $\delta$ relating to the same stream-line, be at the most equal to one-eighth of the inlet angle $\beta$ can be carried out either for the entire blade surface, or for the greater part of the same. These angles are supposed to be determined by the tangents $t$ (Figs. 2, 4 and 6) at the ends of that centre blade-section-line $(\alpha-\alpha)$ which can be drawn at equal distance from the section-lines of blade-face and blade-back.

Of course, the outlet angle $\delta$ can be considerably reduced below one-eighth of the inlet angle, if required. The diagram, Fig. 4 shows, for instance, the blade-sections of a runner for axial admission (Fig. 3), the outlet angle $\delta$ of which is zero, at least in the section with the stream surface $s-s$. But the admission above described of the outlet angle can be successfully carried through even below zero, if the wetted blade surface is reduced below the limit indicated.

In such cases, the outlet angle δ becomes negative, as shown by the diagram, Fig. 6.—Fig. 5 shows the vertical projection of the runner appertaining to these blade sections, the admission of which therefore is inclined relative to the runner axis $z$—$z$. According to the accepted view, the use of such small outlet angles is not permissible, but this view cannot be maintained, if one limits the size of the wetted blade surface according to my invention. On the other hand, the use of such blade sections is not restricted to the shapes of runners and the types of admission shown in the drawing. On the contrary, such sections can also be used in the case of all other runners, the flow of which takes place in orderly stream-surfaces.

The area of a blade surface S (Figs. 1, 3 and 5) which I will refer to as $f$ can be taken from the blade-diagram of a runner, or from the finished model of the same, supposing that the surface of the blade-back $r$ Figs. 4 and 6, be the basis of all further argumentation. As is well-known, the area (F) of that surface of rotation, that is generated by the rotation of the runner inlet edge $e$—$e$ (Figs. 1, 3 and 5) about the runner axis $z$—$z$, can be determined by Guldin's rule. If, therefore, the runner has $n$ blades, a wheel constructed according to my invention must meet the following conditions: $\delta < \frac{\beta}{8}$ and $nf < 3/2$ F, of which the former condition must be fulfilled at least along the greater part of the blade-surface.

That my invention does not avoid the cell-shape of the runner, is shown by the trajectories $n_1$—$n_1$ and $n_2$—$n_2$ in Figs. 2 and 4, which are drawn perpendicular to the stream-lines, as well as by the channel-shaped space, which is enclosed by said trajectories and the blade sections, said space being shown by the hatched lines in the drawing.

The runner blades can be either bent into the desired shape out of sheet metal, or they can be cast. In the case of greatly varying amounts of water, it is advisable to mount the blades adjustably in the hub.

Of course, a runner, constructed according to my invention must have a properly constructed guiding element for admission, and care must be taken to maintain a corresponding amount of energy by the use of suitable suction-pipes.

I claim as my invention:

In a runner for water turbines, centrifugal pumps and the like, blades so shaped that the inlet or outlet angle for the greater part of the blade surface is less than ⅛th of the outlet and inlet angle respectively, measured on the appertaining stream-lines, and that the total blade area is less than 1½ times the area of the surface of revolution generated by the rotation of the runner inlet or outlet edge around the runner axis.

In testimony whereof I affix my signature in presence of two witnesses.

VICTOR KAPLAN.

Witnesses:
 HARIANNE KNY.
 D. HUTTELEY.